United States Patent [19]
Miranda, Jr. et al.

[11] Patent Number: 5,619,253
[45] Date of Patent: Apr. 8, 1997

[54] VIDEO DISPLAY OF INDICIA

[76] Inventors: Henry A. Miranda, Jr., 74 Loomis St.;
Joseph Palmieri, 36 Old Stagecoach
Rd., both of Bedford, Mass. 01730

[21] Appl. No.: 430,246

[22] Filed: Apr. 28, 1995

Related U.S. Application Data

[63] Continuation of Ser. No. 82,620, Jun. 25, 1993, abandoned.

[51] Int. Cl.$^6$ ........................................... H04N 7/14
[52] U.S. Cl. ........................................... 348/15; 348/207
[58] Field of Search .......................... 348/13–21, 207;
354/1, 115

[56] References Cited

U.S. PATENT DOCUMENTS

| | | | |
|---|---|---|---|
| 3,846,826 | 11/1974 | Mueller | 358/81 |
| 4,197,590 | 4/1980 | Sukonick et al. | 345/115 |
| 4,400,724 | 8/1983 | Fields | 348/15 |
| 4,464,118 | 8/1984 | Scott et al. | 434/85 |
| 4,561,017 | 12/1985 | Greene | 358/93 |
| 4,633,436 | 12/1986 | Flurry | 364/900 |
| 4,730,218 | 3/1988 | Goodrich | 358/185 |
| 4,961,211 | 10/1990 | Tsugane et al. | 348/15 |
| 5,025,314 | 6/1991 | Tang et al. | 358/93 |
| 5,027,198 | 6/1991 | Yoshioka | 358/85 |
| 5,239,373 | 8/1993 | Tang et al. | 348/14 |
| 5,256,886 | 10/1993 | Wolf et al. | 250/574 |
| 5,400,069 | 3/1995 | Braun et al. | 348/20 |

FOREIGN PATENT DOCUMENTS 0347725  12/1989  European Pat. Off. ........ G06F 3/033

OTHER PUBLICATIONS

Computer printout of Video Display and Writing, pp. 1–12.

*Primary Examiner*—Joseph Mancuso
*Assistant Examiner*—Bipin Shalwala
*Attorney, Agent, or Firm*—Fish & Richardson P.C.

[57] ABSTRACT

Video communication apparatus includes a first diffusing screen comprising a layer of a transparent material in contact with a layer of a diffusing material such that the surface of the diffusing material not in contact with the transparent material forms a receiving surface that is substantially smooth and of a quality for accepting indicia, and the surface of the diffusing material in contact with the transparent material forms a transmitting surface. A video camera is positioned to provide a first video signal representative of images on the transmitting surface.

19 Claims, 2 Drawing Sheets

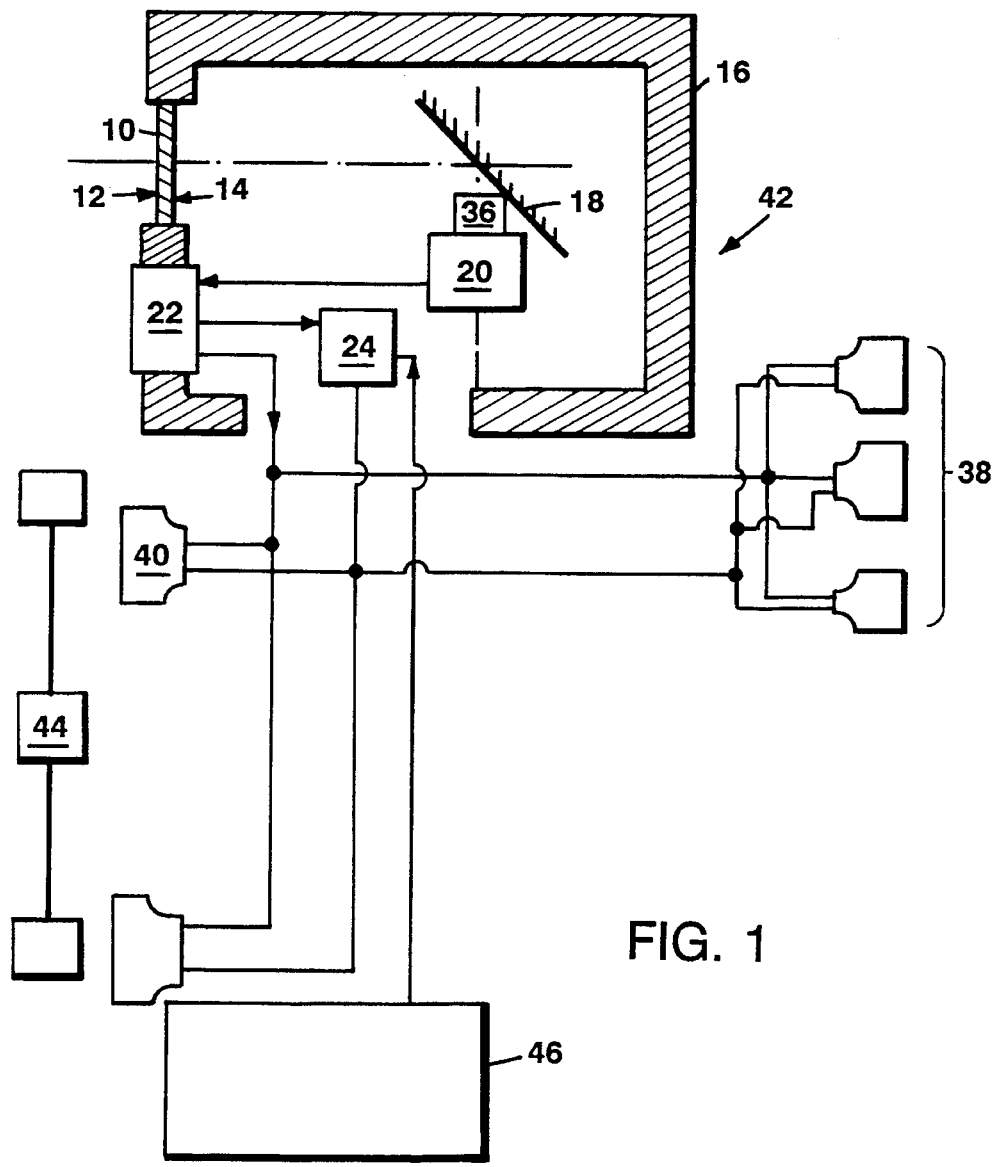
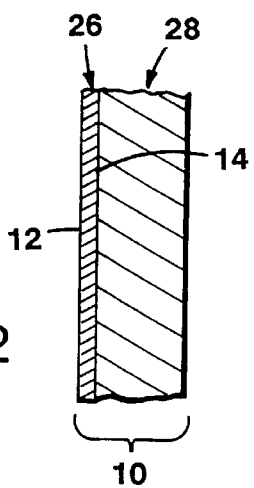
FIG. 2
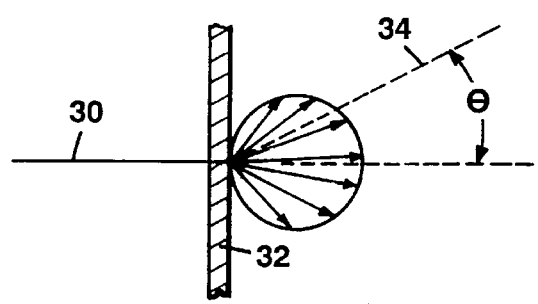
FIG. 3

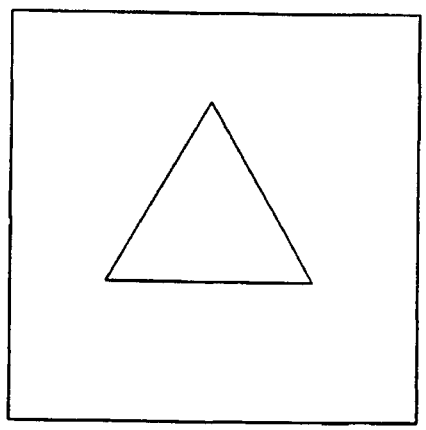
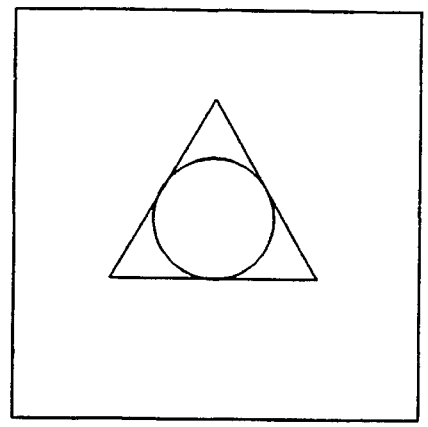
FIG. 4A  FIG. 4B
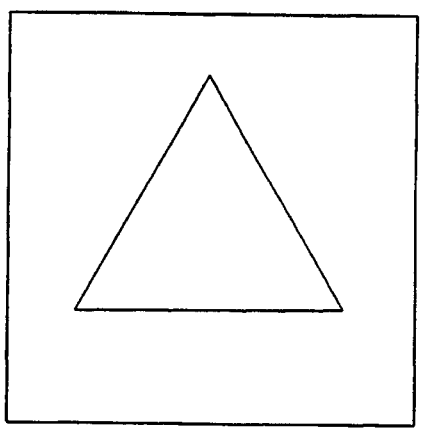
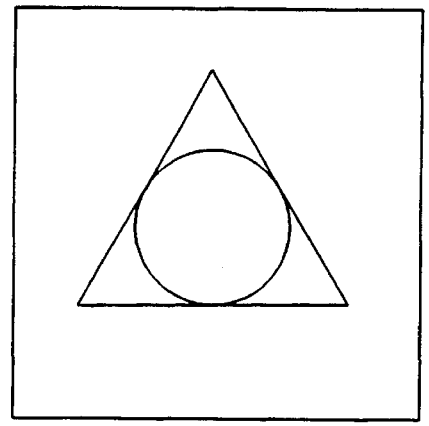
FIG. 4C  FIG. 4D

VIDEO DISPLAY OF INDICIA

This is a continuation of application Ser. No. 08/082,620, filed Jun. 25, 1993, now abandoned.

The present invention relates in general to communication devices, and more particularly concerns novel apparatus for unilaterally and/or interactively and in "real time" communicating diverse types of visual information between or among two or more users.

A search of subclasses 85, 162, 169, 176, 180, and 307 of class 434 and subclasses 81, 85, 93, 102, and 185 of class 358 uncovered U.S. Pat. Nos. 3,846,826; 4,371,893; 4,464,118; 4,561,017; 4,633,436; 4,730,218; and 5,025,314 and European Pat. 0347725.

According to the invention there is a diffusing screen having a receiving surface for receiving indicia (which consists of either handwritten material such as on a conventional whiteboard, or a transparency as used in a typical viewgraph, or a relayed image of a conventional 35 mm slide, etc.) and a transmitting surface opposite the receiving surface for displaying the image of the indicia on the receiving surface. A video camera provides a video signal representative of the image displayed on the transmitting surface. An image reverser, such as a mirror or electronic image reverser, reverses the image displayed on the transmitting surface so that an image displayer, such as comprising a television monitor displays a positive image of the indicia on the receiving surface. That is to say, the displayed positive image is a nonreversed image as would be seen from viewing the image on the receiving surface.

According to another aspect of the invention, there are a plurality of image display systems substantially as described above at spaced locations. The video signals from each video camera may be combined to provide a composite video signal, representative of the combination of positive images of the indicia on the respective receiving surfaces, that is displayed on each image displayer. Further, the video signal provided from one of these systems may be processed such that the positive image of the indicia on the receiving surface of that system is displayed in a distinct manner on each image displayer so as to be readily differentiated by the viewer. The original composite image remains unchanged.

An audio communication system also interconnects the several stations, allowing the various users to discuss and debate additions and changes.

While indicia are being imparted on the receiving surface, those viewing the image displayers see at most only faint shadows of both the tip of the writing instrument and the user's arm and hand. The receiving surface need be exposed to only standard ambient lighting which typically issue from a plurality of sources within the room. Further, if the user desires to change a portion of the information on the screen, he or she does so by simply erasing the appropriate portion of the receiving surface, or by removing the transparency. No other portion of the image seen by the viewers is disturbed.

Numerous other features, objects, and advantages of the invention will become apparent from the following detailed description when read in connection with the accompanying drawings in which:

FIG. 1 is a partially cutaway plan view of an embodiment of the invention;

FIG. 2 is a cutaway view of the diffusing screen;

FIG. 3 is an illustration of the light-scattering distribution of a narrow beam of parallel light passing through an ideal, or lambertian, diffuser; and FIGS. 4A–4D illustrate the highlighting feature.

With reference now to FIG. 1, there is shown a cutaway plan view of an exemplary embodiment of the invention. A diffusing screen 10, having receiving 12 and transmitting 14 surfaces, resides in a housing 16 in the vertical plane. Transmitting surface 14 faces the interior of housing 16, which contains a mirror 18, a video camera 20, a selector 22, and a multiplexer 24.

As shown in FIG. 2, diffusing screen 10 may be constructed by laminating two layers, a diffusing material layer 26 and a transparent material layer 28. The exposed surface of diffusing material layer 26 forms receiving surface 12, and the interior surface of diffusing material layer 26 forms transmitting surface 14. The diffusing material may be selected from among the class of materials that exhibits light-scattering properties approximating those of an ideal scattering medium, such as a lambertian diffuser.

Thus, the diffusing material has a first or interior surface in contact with the transparent material layer 28 and a second surface, the exposed surfaced, spaced from the transparent material by the thickness of the diffusing material. Video camera 20 is thus positioned to provide a first video signal representative of images on the transmitting surface 14 (the first or interior surface of diffusing material layer 26), video camera 20 being separated from receiving surface 12 (the second or exposed surface of diffusing material layer 26) by the transparent material layer 28 and the diffusing material layer 26.

As shown in FIG. 3, a narrow beam of parallel light 30 scatters as it passes through lambertian diffuser 32. This is shown with a light exiting from, instead of impinging upon, diffusing surface 12, so as to simplify the exposition. The intensity of the light at any test point 34 in the scatter pattern is proportional to cosine of the angle $\Theta$ defined by the line containing the narrow beam 30 and the line containing both the test point 34 and the point where the narrow beam passes through diffuser 32. Thus, the locus of the ends of the resultant intensity vectors is, in three dimensions, a sphere.

Several materials have light-scattering properties that approach those of an ideal lambertian diffuser. For example, in the exemplary embodiment the diffusing material is constructed from opal glass which comprises a thin scattering surface bonded to one side of a transparent glass plate. Alternatively, a thin layer of white paper or paint can be bonded to transparent material layer 28 and coated with clear polyurethane, or a compatible mixture of polyurethane and white pigment can be sprayed directly onto one surface of transparent material layer 28, which latter layer can be either glass or plastic.

With any of these alternatives, the receiving surface 12 is of a quality for accepting marking thereupon, and is smooth, so as to permit erasing with ease, (exactly as is done with a conventional whiteboard). Also, irrespective of the material selected, the thickness of the diffusing material must be great enough to approximate the decoupling of a lambertian diffuser, but not as thick as to degrade the spatial resolution of the indicia.

Referring again to FIG. 1, video camera 20 is mounted within housing 16 such that the optical axis of camera lens 36 lies in a horizontal plane parallel to the plane containing diffusing screen 10. Mirror 18 is attached to camera lens 36 and oriented such that its normal lies in the horizontal plane, and is oriented at an angle of 45 degrees, (rotated about the vertical), relative to the optical axis of camera lens 36 such that the latter is made to appear as though it were rotated 90 degrees about a vertical axis, and thus is perpendicular to the vertical plane of diffusing screen 10.

Mirror 18 reverses the image on transmitting surface 14 so that video camera 20 observes a positive image of the indicia on receiving surface 12. The invention embraces other techniques for image reversal that are equally suitable. For example, orienting video camera 20 with the optical axis of the camera lens normal to the screen and then removing mirror 18 and electrically reversing the raster scan of either video camera 20 or the display tube also reverses the image. Another example is the use of folded optics, whereby an additional pair of mirrors is used to reduce the size of enclosure 16.

The signal from video camera 20 enters mode selector 22, a conventional console device. When unilateral operation is selected, the video signal is sent to one or several observation monitors 38, which can be located where desired. These monitors 38 are conventional television video monitors. At the user's election the video signal also energizes local monitor 40, also a conventional monitor. This local monitor 40, in conjunction with housing 16 and the apparatus located therein, comprise a single user station 42. In addition, an audio communication system 44 interconnects all the various stations. This communications system 44 is a conventional full- or half-duplex audio communications network.

When a user selects interactive operation, the video signal generated at his or her station (the local signal) is communicated to multiplexer 24. Similarly, video signals (remote signals) are communicated from the remote stations, and are also fed into multiplexer 24 at the local station. Circuitry in the multiplexer processes the video signals from the remote camera, and generates appropriate synchronization between the remote and local video camera. The resulting multiplexed video signal is transmitted to one or more other user stations 46 (the remote station or stations).

In the first, or typical, mode of interactive operation, multiplexer 24 combines the local and remote signals to produce a single composite signal. For example, when only two stations are interconnected as shown in FIG. 1, an analog multiplexer can be used. In conventional commercial television systems, a single frame is generated every 1/30th of a second by combining the signal generated by the video camera during the alternate-odd horizontal raster line scan, which is known as field A, with the signal generated during the alternate-even horizontal raster line scan, which is known as field B. In the two-station environment, the analog multiplexer at the local station routes the A field from the local video signal and the B field from the remote video signal to the local monitor. The B field from the local video signal and the A field from the remote video signal are discarded. The resulting multiplexed video signal is transmitted to the remote station. In other words, indicia written on the screen at the remote location are viewed by the remote operator on the monitor at the remote site not directly, but rather through multiplexer 24 at the local site.

When the user at the remote station selects the second, or highlight mode of interactive operation, circuitry in either local multiplexer 24 or in the remote station replaces alternating sets of adjacent frames in the local video signal (e.g., ten in number), with a voltage signal equivalent to that which would cause a viewing monitor to go blank for this set of adjacent frames.

In this highlight mode of operation, the viewing monitor displays only the signal information contained in the B-field (from the local station) during each blank period, the A-field information from the remote station being replaced by a constant signal representing a screen brightness corresponding either to a neutral zero or full level. The result is that the television monitor shows a succession of alternating on/off sequences of the A-field contributions to the total screen brightness. The indicia on the remote station writing tablet is thus emphasized in the form of blinking of only that specific portion of the scene constituting the information written are placed thereon; all other information will not be blinking, because the other information appears on every frame.

Referring to FIGS. 4A, 4B, 4C, 4D, there is shown four alternate on/off sequences as displayed on the television monitor, it being assumed that the operator at the local station writes a triangle, and the operator at the remote station write a circle inscribed in the triangle. In FIG. 4A, since only the triangle is visible, the scene represents the condition wherein the B-field is blanked off. In FIG. 4B, the B-field being in the "on close state", both indicia are visible; and in FIGS. 4C and 4D, the pair of on/off sequences is repeated. This modified video signal is then multiplexed in the same manner as during the first mode, and communicated to the other station. The modified indicia are thus seen as "blinking" by all viewers. When the operator is satisfied that the modifications have been communicated, the highlight mode can be eliminated by pressing the appropriate switch.

The system can also be configured so that any station can function as the local station. The interconnections permitting such latitude are more complex than the system described here, but are readily implemented.

Alternative video signal multiplexers can instead be used to generate composite and highlighted video signals. The multiplexing means selected will depend on the number of stations, the desired level of video signal manipulation, and the allowable cost. For example, commercial television video signal mixing equipment can be used in place of the local multiplexer. This type of signal processor is advantageous in that such commercial mixing equipment permits the users to produce "special effects" that may be advantageous in some applications.

Alternatively, the local multiplexer can consist of a video signal digitizer and suitable digital hardware for processing the resultant digital data streams in accordance with one of the many known digital signal-processing techniques. This latter approach is advantageous in that it is very flexible, and it can accommodate the video signals generated by a multitude of stations.

Having described the physical arrangements of the systems, the modes of operation will now be described. A user during either unilateral or interactive operation can impart any desired indicia on the receiving surface 12 of the diffusing screen 10. The user can do so by writing directly on receiving surface 12, or by placing pre-prepared transparencies on the receiving surface 12. Although any writing implement that produces opaque markings are acceptable, dry-erasable markers are desirable.

When the ambient light silhouettes these written indicia, an image appears on transmitting surface 14 of screen 10. Because of the lambertian nature of the diffusing material 26, only those opaque markings in close proximity to receiving surface 12 generate crisply resolved images on transmitting surface 14. Opaque objects not immediately adjacent to receiving surface 12, such as the writing implement and the user's hands and arms (not shown), therefore produce only shadow images on transmitting surface 14, which are: 1) faint, 2) poorly resolved, and 3) not permanent.

As these images on transmitting surface 14 are naturally reversed, reflecting them in mirror 18 restores their proper orientation before they are sensed by video camera 20. The various monitors 38, 40 therefore display properly oriented images of the material on receiving surface 12, largely free from distracting shadows of the user's arm or pen. Should the user desire to alter the image on receiving surface 12, the user can do so easily by erasing or otherwise removing only the undesired portions of the indicia.

In the first, or typical mode of interactive operation, several users are able to impart any desired indicia to their respective receiving surfaces. The single video signal generated by each local multiplexer shows superimposed on each local monitor all of the images communicated by the remote station or stations. To add to this composite image, a user holds his or her writing instrument close to, but not touching, his or her local receiving surface. This holding causes a faint shadow to appear on the superimposed image. By moving the instrument while observing the monitor, the user can locate the appropriate point at which to begin sketching. His or her additions therefore can be made to blend seamlessly into the composite image.

Should any user during interactive operation wish to suggest a change to the aggregated image, he or she selects the second, or highlight mode. Depending on the multiplexer used, the portion of the composite image attributable to the material on that one user's screen is highlighted in some manner. For example, using the analog multiplexer in a two-station environment, when this highlight mode is selected, the indicia on that user's receiving surface is shown blinking on both the local and the remote monitors. Alternatively, if the video signal is digitized, the highlighted changes can be shown, for example, in a different color.

Throughout the interactive operation, the users are free to communicate over the audio communication system, allowing them to explain or discuss any additions or changes to the composite image.

Other embodiments are within the claims.

What is claimed is:

1. Video communication apparatus comprising:

a first diffusing screen comprising a layer of a transparent material in contact with a layer of a diffusing material, said diffusing material having a first surface in contact with said transparent material and a second surface spaced from said transparent material by the thickness of said diffusing material, said second surface forming a receiving surface that is substantially smooth and of a quality for accepting indicia thereupon, said first surface of said diffusing material in contact with said transparent material forming a transmitting surface; and a video camera positioned to provide a first video signal representative of images on said transmitting surface, said video camera separated from said second surface by said transparent material and said diffusing material, wherein said diffusing material is thin diffusing material bonded to one side of said transparent material, the thickness of said diffusing material being great enough to approximate the decoupling of a lambertian diffuser, but not so thick as to degrade the spatial resolution of the indicia.

2. Apparatus in accordance with claim 1 and further comprising:

an image reverser after said transmitting surface.

3. Apparatus in accordance with claim 2 wherein said image reverser is a mirror.

4. Apparatus in accordance with claim 1 and further comprising:

a video display responsive to said first video signal for displaying an image of the indicia on said receiving surface.

5. Apparatus in accordance with claim 4 wherein said video display includes an image reverser.

6. Apparatus in accordance with claim 4 and further comprising:

a second of said diffusing screens;

a second video camera positioned to provide a second video signal representative of the image on said second diffusing screen transmitting surface;

said second video camera separated from the second surface of the diffusing material comprising the second diffusing screen by the latter diffusing material and the transparent material comprising the second diffusing screen, a multiplexer for combining said first and second video signals into a combined video signal; and a coupler coupling said combined video signal to said video display.

7. Apparatus in accordance with claim 6 and further comprising:

a highlighter for processing said first video signal so that when said combined video signal is displayed on said video display, the displayed image portion that is the image of indicia on the receiving surface of said first diffusing screen is highlighted in a manner that distinguishes it from the displayed image portion that is the image of indicia on the receiving surface of said second diffusing screen.

8. Apparatus in accordance with claim 1 wherein said diffusing material is opal glass/plastic.

9. Apparatus in accordance with claim 1 wherein said transparent material is transparent glass.

10. Apparatus in accordance with claim 1 wherein said transparent material is transparent plastic.

11. Apparatus in accordance with claim 1 wherein said diffusing material is white paper coated with clear polyurethane.

12. Apparatus in accordance with claim 1 wherein said diffusing material is white paint coated with clear polyurethane.

13. Apparatus in accordance with claim 1 wherein said diffusing material is a compatible mixture of polyurethane and white paint.

14. Communication network apparatus comprising:

(1) a plurality of stations, each station comprising:

a diffusing screen comprising a layer of a transparent material in contact with a layer of a diffusing material, said diffusing material having a first surface in contact with said transparent material and a second surface spaced from said transparent material by the thickness of said diffusing material, said second surface forming a receiving surface that is substantially smooth and of a quality for accepting indicia thereupon, said first surface of said diffusing material in contact with said transparent material forming a transmitting surface;

a video camera positioned to provide a video signal representative of images on said transmitting surface;

said video camera separated from said second surface by said transparent material and said diffusing material;

wherein said diffusing material is thin diffusing material bonded to one side of said transparent material, the thickness of said diffusing material being great enough to approximate the decoupling of a lambertian diffuser but not so thick as to degrade spatial resolution of the indicia, and (2) a multiplexer at one location for combining said video signals to provide a combined video signal, which is then transmitted to all other stations.

15. Apparatus in accordance with claim 14 and further comprising:

an audio communications system interconnected among said stations allowing verbal and other audio information to be communicated among said stations.

16. Apparatus in accordance with claim 14 wherein each station further comprises a video display responsive to said combined video signal for displaying a composite image of the images on the receiving surfaces of said diffusing screens.

17. Apparatus in accordance with claim 14 and further comprising:

a highlighter for processing one of said video signals so that when said combined video signal is displayed on said video display, the displayed image portion that is the image of indicia on the receiving surface of said diffusing screen represented by the processed video signal is highlighted in a manner that distinguishes it from the displayed image portion that is the image of combined indicia on the receiving surfaces not represented by the processed video signal.

18. Apparatus in accordance with claim 14 wherein said diffusing screen is constructed and arranged so that indicia written on said second surface can be erased, exactly as in a conventional whiteboard.

19. Apparatus in accordance with claim 14 wherein said diffusing screen is constructed and arranged so that ordinary acetate viewgraphs can be placed on said second surface and observed on the video display.

* * * * *